United States Patent
Kang et al.

(10) Patent No.: US 9,251,956 B2
(45) Date of Patent: Feb. 2, 2016

(54) CONDUCTIVE RESIN COMPOSITION AND MULTILAYER CERAMIC CAPACITOR HAVING THE SAME

(75) Inventors: Sung Koo Kang, Gyunggi-do (KR);
Myung Jun Park, Gyunggi-do (KR);
Hyun Hee Gu, Gyunggi-do (KR);
Kyung Pyo Hong, Gyunggi-do (KR);
Chang Hoon Kim, Gyunggi-do (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 487 days.

(21) Appl. No.: 13/558,098

(22) Filed: Jul. 25, 2012

(65) Prior Publication Data

US 2013/0294006 A1    Nov. 7, 2013

(30) Foreign Application Priority Data

May 4, 2012    (KR) .......................... 10-2012-0047293

(51) Int. Cl.
| | |
|---|---|
| *H01G 4/008* | (2006.01) |
| *H01G 4/228* | (2006.01) |
| *H01G 4/232* | (2006.01) |
| *C08L 63/00* | (2006.01) |
| *H01B 1/22* | (2006.01) |
| *C08G 59/42* | (2006.01) |
| *C08G 59/62* | (2006.01) |
| *C08K 3/08* | (2006.01) |
| *C08K 9/02* | (2006.01) |

(52) U.S. Cl.
CPC .............. *H01G 4/2325* (2013.01); *C08G 59/42* (2013.01); *C08G 59/621* (2013.01); *C08L 63/00* (2013.01); *H01B 1/22* (2013.01); *C08K 3/08* (2013.01); *C08K 9/02* (2013.01); *C08K 2201/001* (2013.01)

(58) Field of Classification Search
USPC ................................... 361/305, 306.3, 301.4
See application file for complete search history.

(56) References Cited

U.S. PATENT DOCUMENTS

| | | |
|---|---|---|
| 4,122,143 A | 10/1978 | Momotari et al. |
| 4,387,115 A | 6/1983 | Kitamura et al. |
| 2002/0062990 A1 | 5/2002 | Kikuchi et al. |
| 2005/0248908 A1 | 11/2005 | Dreezen et al. |
| 2006/0145125 A1 | 7/2006 | Kuwajima et al. |
| 2009/0139754 A1 | 6/2009 | Ikarashi et al. |
| 2011/0132637 A1 | 6/2011 | Otani et al. |

FOREIGN PATENT DOCUMENTS

| | | |
|---|---|---|
| CN | 1378416 A | 11/2002 |
| CN | 1788062 A | 6/2006 |
| CN | 101275052 A | 10/2008 |
| CN | 101892026 A | 11/2010 |
| CN | 102391813 A | 3/2012 |
| DE | 3131364 A1 | 8/1982 |

(Continued)

OTHER PUBLICATIONS

Office Action issued in German Patent Application No. 102012106371.0 dated Feb. 27, 2013.

(Continued)

*Primary Examiner* — Eric Thomas
(74) *Attorney, Agent, or Firm* — McDermott Will & Emery LLP

(57) ABSTRACT

There is provided a conductive resin composition including epoxy resin, copper powder particles, and non-nitrogen-based hardeners.

13 Claims, 1 Drawing Sheet

(56) References Cited

FOREIGN PATENT DOCUMENTS

| | | |
|---|---|---|
| JP | 04-206402 A | 7/1992 |
| JP | 06-084693 A | 3/1994 |
| JP | 07-025985 A | 1/1995 |
| JP | 08-037127 A | 3/1996 |
| JP | 2002-053644 A | 2/2002 |
| JP | 2004-221312 A | 8/2004 |
| KR | 10-2005-0104357 | 11/2005 |
| KR | 10-0586962 B1 | 6/2006 |
| KR | 10-2011-0063311 | 6/2011 |
| KR | 10-2011-0108577 | 6/2011 |
| KR | 101088631 B1 | 11/2011 |
| WO | 2004/078870 A1 | 9/2004 |
| WO | 2011102659 A2 | 8/2011 |

OTHER PUBLICATIONS

Korean Office Action issued in Korean Application No. 10-2012-0047293 dated Apr. 29, 2014, w/English translation.

Office Action issued on Dec. 10, 2013 in the corresponding Japanese Patent Application No. 2012-164501.

Korean Office Action issued in Application No. 10-2012-0047293 dated Oct. 24, 2013.

Chinese Office Action issued in Chinese Application No. 201210258555.7 dated Feb. 17, 2015, with English Translation.

CONDUCTIVE RESIN COMPOSITION AND MULTILAYER CERAMIC CAPACITOR HAVING THE SAME

CROSS-REFERENCE TO RELATED APPLICATIONS

This application claims the priority of Korean Patent Application No. 10-2012-0047293 filed on May 4, 2012, in the Korean Intellectual Property Office, the disclosure of which is incorporated herein by reference.

BACKGROUND OF THE INVENTION

1. Field of the Invention

The present invention relates to a conductive resin composition, a multilayer ceramic capacitor having the same, and a method of manufacturing the same.

2. Description of the Related Art

Examples of electronic components using ceramic materials may include a capacitor, an inductor, a piezoelectric element, a varistor, a thermistor, and the like.

Among ceramic electronic components, a multilayer ceramic capacitor (MLCC) includes a ceramic element formed of ceramic materials, internal electrodes formed therein, external electrodes formed on surfaces of the ceramic element to be electrically connected to the internal electrodes and can be miniaturized and easily mounted while securing a high level of capacitance.

Due to these advantages, multilayer ceramic capacitors are mounted on printed circuit boards used in various electronic products such as computers, personal digital assistants (PDAs), mobile phones, and the like, may be chip type capacitors that serve to store or discharge electricity and may have various sizes and amounts of stacked layers, according to usage and capacitance.

In particular, as electronic products are miniaturized, demand for microminiaturized and multilayer ceramic capacitors having ultrahigh-capacitance is increasing. To this end, the multilayer ceramic capacitor has been manufactured by allowing the thickness of a dielectric layer and internal electrodes to be thin and stacking a large number of dielectric layers.

The microminiaturized and ultrahigh-capacitance multilayer ceramic capacitor needs a high level of reliability as a wide range of applications requiring a high degree of reliability such as in vehicle headlights, medical devices, or the like have been digitalized and a demand therefor has been increased.

Examples of factors causing the problems with respect to high reliability may include crack occurrence of the external electrodes due to external impacts, permeation of a plating solution into the ceramic element through the external electrode layer during a plating process, and the like.

Therefore, in order to solve the problem, external impacts are absorbed and the permeation of the plating solution is effectively prevented, by applying a resin composition including conductive materials between the external electrodes and a plating layer, thereby improving the reliability.

Meanwhile, in the related art, silver (Ag) with excellent conductivity and high reliability has mainly used as the conductive resin composition. However, the use of silver (Ag), a relatively expensive precious metal, is a factor in increasing product manufacturing costs.

SUMMARY OF THE INVENTION

An aspect of the present invention provides a new method of reducing product manufacturing costs while maintaining reliability of a multilayer ceramic capacitor at a predetermined level.

According to an aspect of the present invention, there is provided a conductive resin composition, including: epoxy resin; copper (Cu) powder particles; and non-nitrogen-based hardeners.

The epoxy resin may be added in an amount of 7.5 to 20 wt % based on an amount of copper powder.

Surfaces of the copper powder particles may be coated with silver (Ag).

The non-nitrogen-based hardener may be at least one of active esters of onium salts, sulfonium salts, phosphonium salts, and taga carbonic acid.

The non-nitrogen-based hardener may be a phenolic hardener.

The non-nitrogen-based hardener may be an anhydride hardener.

The conductive resin composition may further include: additives for a necking formation.

The additives for the necking formation may be reducing agents, conductive properties imparting agents, and organic complexes.

The reducing agent may be at least one of ascorbic acid, sodium borohydride, formic acid, oxalic acid, phosphites, hypophosphites, phosphorous acid, and dithiothreitol.

The conductive properties imparting agent may be at least one of carbon black, carbon nanotubes, and graphene.

The organic complex may be Cu chelate of at least one of imidazoles, amines, ethylene diamine tetra acetic acid (EDTA), carboxys, and ureas.

According to another aspect of the present invention, there is provided a multilayer ceramic capacitor, including: a ceramic element in which a plurality of dielectric layers are stacked; a plurality of first and second internal electrodes formed on at least one surface of the dielectric layer and respectively alternately exposed through both ends of the ceramic element; first and second external electrodes formed on both ends of the ceramic element and electrically connected to the first and second internal electrodes; first and second conductive resin layers formed of a conductive resin composition including epoxy resin, copper powder particles, and non-nitrogen-based hardeners and formed on surfaces of the first and second external electrodes; and first and second plating layers formed on surfaces of the first and second conductive resin layers.

The first and second plating layers may include a nickel (Ni) plating layer formed on the surfaces of the first and second conductive resin layers, and a tin (Sn) plating layer formed on a surface of the nickel plating layer.

According to another aspect of the present invention, there is provided a method of manufacturing a multilayer ceramic capacitor, including: preparing a plurality of ceramic sheets; forming first and second internal electrode patterns on the ceramic sheets; forming a laminate by stacking the ceramic sheets on which the first and second internal electrode patterns are formed; forming a ceramic element having a plurality of first and second internal electrodes by cutting the ceramic laminate so as to alternately expose ends of the first and second internal electrode patterns, respectively, through both ends of the laminate and sintering the cut ceramic laminate; forming first and second external electrodes on both ends of the ceramic element by using a conductive paste containing copper (Cu) and electrically connecting the first and second external electrodes to exposed portions of the first and second internal electrodes, respectively; forming first and second conductive resin layers of conductive resin paste including epoxy resin, copper powder particles, and non-nitrogen-based hardeners on surfaces of the first and second external electrodes; and plating surfaces of the first and second conductive resin layers with a composition including nickel-zinc (Ni—Zn).

The additives for a necking formation may be added by being injected into a capsule broken before reaching a hardening temperature.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
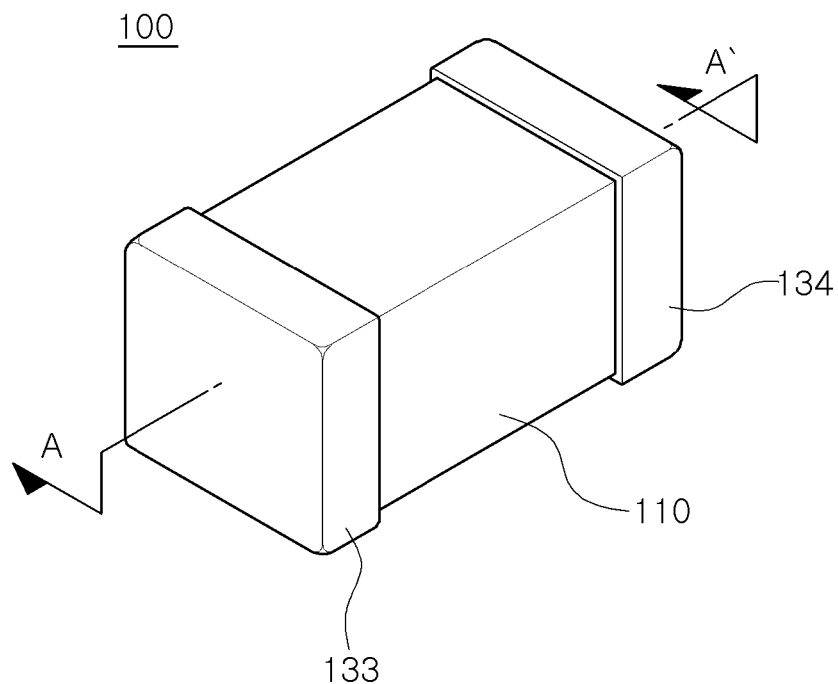
FIG. 1 is a perspective view schematically showing a multilayer ceramic capacitor according to an embodiment of the present invention.

Embodiments of the present invention will now be described in detail with reference to the accompanying drawings.

The embodiments of the present invention may be modified in many different forms and the scope of the invention should not be seen as being limited to the embodiments set forth herein.

Rather, these embodiments are provided so that this disclosure will be thorough and complete, and will fully convey the concept of the invention to those skilled in the art.

In the drawings, the shapes and dimensions may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present invention relates to ceramic electronic components. Examples of the ceramic electronic components according to an embodiment of the present invention may include a multilayer ceramic capacitor, an inductor, a piezoelectric element, a varistor, a chip resistor, a thermistor, and the like. Hereinafter, as an example of ceramic electronic products, the multilayer ceramic capacitor will be described.

Figure 2:
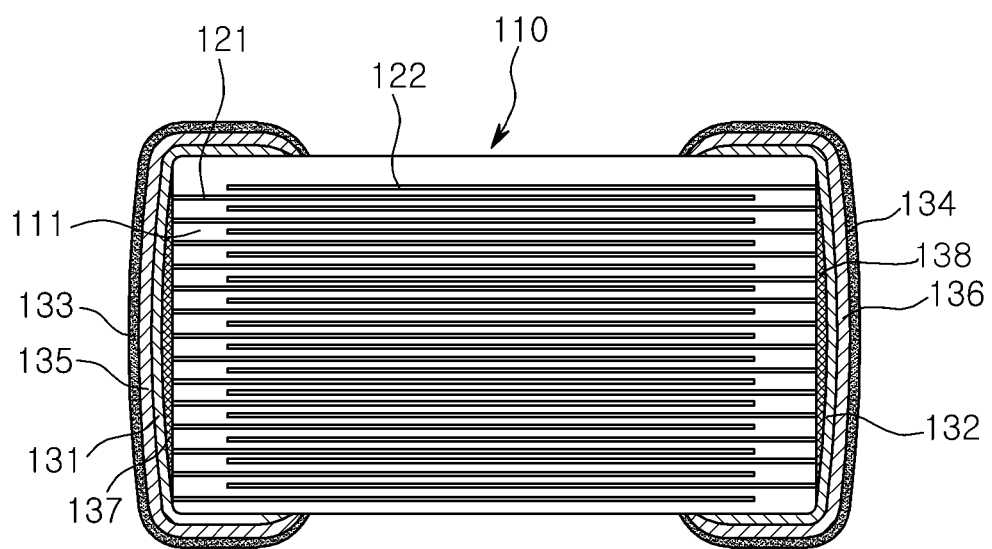
FIG. 2 is a cross-sectional view of line A-A' of FIG. 1.

Referring to FIGS. 1 and 2, a multilayer ceramic capacitor 100 according to an embodiment of the present invention includes a ceramic element 110 in which a plurality of dielectric layers 111 are stacked, a plurality of first and second internal electrodes 121 and 122 formed on at least one surface of dielectric layers 111, first and second external electrodes 137 and 138 formed at both ends of the ceramic element 110 and electrically connected to the first and second internal electrodes 121 and 122, first and second conductive resin layers 131 and 132 formed on surfaces of the first and second external electrodes 137 and 138, and first and second plating layers 133, 134, 135, and 136 formed on surfaces of the first and second conductive rein layers 131 and 132.

The ceramic element 110 is manufactured by stacking the plurality of dielectric layers 111 and then, sintering the stacked dielectric layers, wherein the dielectric layers 111 may be integrated such that a boundary between the adjacent dielectric layers 111 may not be readily apparent in a sintered state.

In addition, the ceramic element 110 may generally have a rectangular parallelepiped shape, but the present invention is not limited thereto.

In addition, a dimension of the ceramic element 110 is not particularly limited, but a high-capacitance stacked ceramic capacitor may be manufactured by configuring the ceramic element to have a size of, for example, 0.6 mm×0.3 mm, and the like.

In addition, an outermost surface of the ceramic element 110 may be further provided with a predetermined thickness of a cover portion dielectric layer (not shown), if necessary.

The dielectric layer 111 contributes to the formation of capacitance in a capacitor and a thickness of a single dielectric layer 111 may be arbitrarily changed so as to meet a design of the capacitance of the stacked ceramic capacitor. A thickness of one layer may be configured so as to be within a range of 0.1 to 1.0 μm after sintering, but the present invention is not limited thereto.

In addition, the dielectric layer 111 may include high-K ceramic materials, for example, a $BaTiO_3$-based ceramic powder, and the like, but the present invention is not limited thereto.

An example of the $BaTiO_3$-based ceramic powders may include $(Ba_{1-x}Ca_x)TiO_3$, $Ba(Ti_{1-y}Ca_y)O_3$, $(Ba_{1-x}Ca_x)(Ti_{1-y}Zr_y)O_3, Ba)(Ti_{1-y}Zr_y)O_3$, and the like, in which Ca, Zr, and the like, are partially doped to $BaTiO_3$, but the present invention is not limited thereto.

Meanwhile, the dielectric layer 111 may have various ceramic additives such as transition metal oxides or carbides, rare earth elements, magnesium (Mg), aluminum (Al), and the like, organic solvents, plasticizers, coupling agents, dispersants, and the like, together with the ceramic powders added thereto.

The first and second internal electrodes 121 and 122 are formed on the ceramic sheet forming the dielectric layer 111 and are stacked and then, are formed in the ceramic element 110 by the sintering, having one dielectric layer 111 therebetween.

The first and second internal electrodes 121 and 122 are a pair of electrode having different polarities and are disposed to face each other according to the stacking direction of the dielectric layers 111 and are electrically insulated from each other by the dielectric layer 111 disposed in the middle thereof.

In addition, ends of the first and second internal electrodes 121 and 122 are respectively exposed through both ends of the ceramic element 110. As such, ends of the first and second internal electrodes 121 and 122 alternately exposed to one end surface of the ceramic element 110 are respectively electrically connected to the first and second external electrodes 137 and 138.

The first and second internal electrodes 121 and 122 are formed of conductive metals. For example, the first and second internal electrodes 121 and 122 formed of nickel (Ni), nickel (Ni) alloy, and the like, may be used, but the present invention is not limited thereto.

Therefore, when voltage of a predetermined level is applied to the first and second external electrodes 137 and 138, charges are accumulated between the first and second internal electrodes 121 and 122 facing each other. In this case, capacitance of the stacked ceramic capacitor 100 is in proportion to an area of the first and second internal electrodes 121 and 122 facing each other.

The first and second external electrodes 137 and 138 may be formed by sintering conductive paste for the external electrodes including copper (Cu) so as to provide highly reliable heat-resistant cyclicity, humidity resistance and the like, while having good electric characteristics, but the present invention is not limited thereto.

The first and second plating layers are provided to further increase bonding strength when the ceramic capacitor 100 is soldered to the substrate, and the like, and the plating processing is performed according to a known method in the art, while lead-free plating may be performed in consideration of environment, but the present invention is not limited thereto.

For example, the first and second plating layers may be configured to include a pair of nickel (Ni) plating layers 135 and 136, respectively formed on outer surfaces of the first and second conductive resin layers 131 and 132, and a pair of tin (Sn) plating layers 133 and 134 formed on outer surfaces of the nickel plating layers 135 and 136, respectively.

The conductive resin layers 131 and 132 may be formed of the conductive resin composition including epoxy resin, a copper powder, and non-nitrogen-based hardeners. Surfaces of the copper powder particles may be coated with silver, if necessary.

Here, the hardener serves to connect resins having epoxy functional groups. However, since it may be difficult to mix the epoxy resin used for the conductive paste with the hardener whenever the epoxy resin is used, a liquid in which the hardener has previously been mixed may be used.

The hardener used when one liquid-type epoxy resin is prepared is referred to as a potential hardener, which serves as a hardener when characteristics of a hardening atmosphere such as heating, UV illumination, gas removal, and the like, from the outside, are controlled.

A representative material as the potential hardener is an amine or an imidazole-based material. The amine and imidazole are dissolved or eluted by forming copper ions and complex when meeting copper, thereby causing a greening phenomenon.

The greening phenomenon changes a color of a composition and promotes a hardening reaction of epoxy to form a thin film, or the like, thereby causing problems such as shortening paste lifespan, increasing viscosity, and the like.

In the embodiment, in order to solve the problems present in the case of using the nitrogen-based hardeners according to the related art such as the amines, imidazoles, and the like, the epoxy paste is prepared using a cationic hardener, a phenolic hardener, an anhydride hardener, and the like, such as active esters of onium salts, sulfonium salts, phosphonium salts, taga carbonic acid, and the like, thereby improving aging of epoxy resin.

The nitrogen-based hardener used in the related art is mainly a nucleophilic, while the cationic hardener used in the present embodiment is electrophilic. Here, the operating mechanisms thereof are different from each other.

In addition, when a hardener having a hydroxyl group such as a phenolic hardener is used, hardening is performed by the same mechanism as that of amines (nucleophilically), which does not cause the problem of greening and may be appropriate for paste phase stability.

Meanwhile, additives for a necking formation such as reducing agents, conductive properties imparting agents, and organic complexes may be added so as to easily form contacts or necking between respective particles.

As the reducing agent, at least one of ascorbic acid, sodium borohydride, formic acid, oxalic acid, phosphites, hypophosphites, phosphorous acid, and dithiothreitol may be used.

As the conductive properties imparting agent, at least one of carbon black, carbon nanotubes, and graphene may be used.

In addition, the organic complex may be mixed with a Cu chelate of at least one of imidazoles, amines, ethylene diamine tetra acetic acid (EDTA), carboxys, and ureas.

Therefore, the additives for the necking formation assist hardeners and the necking between particles of the copper ions, thereby further improving the conductivity in copper-epoxy.

In this case, the additives for the necking formation have an effect on the aging change of the epoxy resin and therefore, may be mixed by being injected into a capsule, or the like, damaged before the hardening temperature is reached.

Meanwhile, the following Table 1 evaluates nickel plating ability and bonding strength with respect to the external electrode according to the epoxy resin content of the conductive resin layer. Here, as the metal, copper was used.

TABLE 1

| Item | Comparative Example 1 | Inventive Example 1 | Inventive Example 2 | Inventive Example 3 | Inventive Example 4 | Inventive Example 5 | Comparative Example 2 |
|---|---|---|---|---|---|---|---|
| Metal (%) | 63.4 | 68.4 | 72.7 | 75.5 | 78.7 | 81.4 | 84.2 |
| Epoxy (%) | 15.9 | 13.7 | 10.9 | 9.5 | 7.9 | 6.1 | 4.2 |
| Solvent (%) | 20.7 | 17.9 | 16.4 | 15.0 | 13.4 | 12.5 | 11.6 |
| Content of Epoxy to Metal (%) | 25.0 | 20.0 | 15.0 | 12.5 | 10.0 | 7.5 | 5.0 |
| Ni Plating defect | Occurrence | Non-occurrence | Non-occurrence | Non-occurrence | Non-occurrence | Non-occurrence | Non-occurrence |
| Piezo test (15 nm), Average support distance (nm) | 7.23 | 9.07 | 9.42 | 10.93 | 9.57 | 9.15 | 7.04 |
| (260° C., 10 sec), Lifting defect | 0/30 | 0/30 | 0/30 | 0/30 | 0/30 | 0/30 | 1/30 |
| (300° C., 5 sec), Lifting defect | 0/30 | 0/30 | 0/30 | 0/30 | 0/30 | 0/30 | 5/30 |
| Reflow, (270° C., 5 minutes three times), Lifting defect | 0/30 | 0/30 | 0/30 | 0/30 | 0/30 | 0/30 | 7/30 |

Referring to Table 1 above, the content of epoxy to metal is in a range of 7.5 to 20%, which does not cause the lifting defect with the external electrode without causing the plating defect of the nickel plating layer formed on the first and second conductive resin layers.

That is, when the amount of the epoxy resin exceeds 20% for the copper powder particles (Comparative Example 1), the bonding strength between the conductive resin layer and the external electrode is increased and thus, the lifting defect does not occur, but since the conductive resin layer is broken, defects may occur at the time of plating the nickel plating layer.

In addition, when the amount of the epoxy resin is less than 7.5% for the copper powder particles (Comparative Example 2), buffering power of the conductive resin layer is increased and thus, the breakage phenomenon thereof does not occur and the defect does not occur at the time of plating the nickel plating layer, but adhesivity is too low, which may cause the lifting phenomenon between the conductive resin layer and the external electrode.

Therefore, according to Table 1 above, in the Inventive Examples, it may be appreciated that an appropriate content of the epoxy resin is 7.5 to 20 wt % based on an amount of copper power to prevent the lifting phenomenon of the external electrode while forming the nickel plating layer without defects.

In addition, a piezo test is a test for detecting nondestructive warpage cracks. In an X7R type MLCC, $BaTiO_3$, a main component of the dielectric layer, has piezoelectric characteristics that mechanical energy is converted into electrical energy, and therefore, crack occurrence was determined by measuring the electrical energy generated at the time of evaluating the warpage strength.

In the present evaluation, it was compressed to 15 mm at a speed of 1 mm/sec and released after pressure being maintained for 5 seconds. In this case, the electrical signal such as the generated charge and current was measured, which was in turn, stored as data.

Referring to the data, the average support distance was 9 to 10 nm in Inventive Examples 1 to 5, while in the case of Comparative Examples 1 and 2, the average support distance had a relatively large difference of 7 nm and therefore, it could be confirmed that in the range of the present invention, the strength of a stacked ceramic capacitor is more excellent than Comparative Examples.

Hereinafter, a method of manufacturing a stacked ceramic capacitor according to an embodiment of the present invention will be described.

First, a plurality of dielectric sheets are prepared.

The ceramic sheet is provided to form the dielectric layer 111 of the ceramic element 110 and slurry is prepared by mixing a ceramic powder, a polymer, and a solvent and is formed as a sheet having a thickness of several μm by a Doctor blade method.

Next, the conductive paste is printed on at least one surface of each of the ceramic sheets to have a predetermined thickness to form the first and second internal electrode patterns.

In this case, the first and second internal electrode patterns are respectively exposed through both ends of the ceramic sheet.

In addition, an example of a method of printing the conductive paste may include a screen printing method, a gravure printing method, and the like, but the present invention is not limited thereto.

Next, a laminate is formed by alternately stacking the plurality of dielectric sheets on which the first and second internal electrode patterns are formed and compressing the plurality of dielectric sheets and the conductive paste formed on the ceramic sheet, by performing pressing in the stacking direction.

Next, the laminate is cut into individual capacitors formed as a chips so that ends of the first and second internal electrode patterns are respectively alternately exposed through both ends of the laminate and which are then fired at high temperature, thereby completing the ceramic element 110 having the plurality of first and second internal electrodes 121 and 122.

Next, the first and second external electrodes 131 and 132 are formed of the conductive paste including copper, and the like, so as to be electrically connected to the first and second internal electrodes 121 and 122 by covering the exposed portions of the first and second internal electrodes 121 and 122 that are exposed to both ends of the ceramic element 110.

Next, the first and second conductive resin layers 135 and 136 formed of the conductive resin paste including epoxy resin, a copper powder, and non-nitrogen-based hardeners are formed on the surfaces of the first and second external electrodes 131 and 132.

In this case, an example of the non-nitrogen-based hardener may include one of a cationic hardener, a phenolic hardener, an anhydride hardener, that is, at least one of active esters of onium salts, sulfonium salts, phosphonium salts, and taga carbonic acid.

Meanwhile, the surfaces of the copper powder particles are coated with silver, if necessary.

In addition, the additives for the necking formation may be further added so as to more improve conductivity. The additives for the necking formation may include the reducing agents, the conductive properties imparting agents, the organic complexes, and the like.

As the reducing agent, at least one of ascorbic acid, sodium borohydride, formic acid, oxalic acid, phosphites, hypophosphites, phosphorous acid, and dithiothreitol may be used.

In addition, as the conductive properties imparting agent, at least one of carbon black, carbon nanotubes, and graphene may be used.

In addition, the organic complex may be used by being mixed with Cu chelate of at least one of imidazoles, amines, ethylene diamine tetra acetic acid (EDTA), carboxys, and ureas.

In this case, the additives for the necking formation have an effect on the aging change of the epoxy resin and therefore, may be added by being injected into a capsule, or the like, damaged before the hardening temperature.

Next, the surfaces of the first and second conductive resin layers 135 and 136 are plated. In this case, as the material used for the plating, nickel, tin, nickel-tin alloy, and the like, may be used. If necessary, the nickel plating layer and the tin plating layer may be sequentially stacked on the external electrode.

As set forth above, according to the embodiments of the present invention, the product manufacturing costs may be reduced by replacing the conductive resin layer formed between the external electrodes and the plating layer with relatively cheap copper powder particles or silver-coated copper powder particles instead of silver powder particles.

While the present invention has been shown and described in connection with the embodiments, it will be apparent to those skilled in the art that modifications and variations may be made without departing from the spirit and scope of the invention as defined by the appended claims.

What is claimed is:

1. A conductive resin composition, comprising:
   epoxy resin;
   copper (Cu) powder particles;
   non-nitrogen-based hardeners; and
   additives for necking formation,
   wherein the additives for the necking formation are reducing agents, conductive properties imparting agents, and organic complexes.

2. The conductive resin composition of claim 1, wherein the epoxy resin is added in an amount of 7.5 to 20 wt % based on an amount of copper powder.

3. The conductive resin composition of claim 1, wherein surfaces of the copper powder particles are coated with silver (Ag).

4. The conductive resin composition of claim 1, wherein the non-nitrogen-based hardener is at least one of active esters of onium salts, sulfonium salts, phosphonium salts, and polyvalent carbonic acid.

5. The conductive resin composition of claim 1, wherein the non-nitrogen-based hardener is a phenolic hardener.

6. The conductive resin composition of claim 1, wherein the non-nitrogen-based hardener is an anhydride hardener.

7. The conductive resin composition of claim 1, wherein the reducing agent is at least one of ascorbic acid, sodium borohydride, formic acid, oxalic acid, phosphites, hypophosphites, phosphorous acid, and dithiothreitol.

8. The conductive resin composition of claim 1, wherein the conductive properties imparting agent is at least one of carbon black, carbon nanotubes, and graphene.

9. The conductive resin composition of claim 1, wherein the organic complex is Cu chelate of at least one of imidazoles, amines, ethylene diamine tetra acetic acid (EDTA), carboxys, and ureas.

10. A multilayer ceramic capacitor, comprising:
    a ceramic element in which a plurality of dielectric layers are stacked;
    a plurality of first and second internal electrodes formed on at least one surface of the dielectric layer and respectively alternately exposed through both ends of the ceramic element;
    first and second external electrodes formed on both ends of the ceramic element and electrically connected to the first and second internal electrodes;
    first and second conductive resin layers formed of a conductive resin composition including epoxy resin, copper powder particles, non-nitrogen-based hardeners, and additives for necking formation and formed on surfaces of the first and second external electrodes; and
    first and second plating layers formed on surfaces of the first and second conductive resin layers,
    wherein the additives for the necking formation are reducing agents, conductive properties imparting agents, and organic complexes.

11. The multilayer ceramic capacitor of claim 10, wherein the epoxy resin is added in an amount of 7.5 to 20 wt % based on an amount of copper powder.

12. The multilayer ceramic capacitor of claim 10, wherein surfaces of the copper powder particles are coated with silver (Ag).

13. The multilayer ceramic capacitor of claim 10, wherein the first and second plating layers are formed to include a nickel (Ni) plating layer formed on the surfaces of the first and second conductive resin layers and a tin (Sn) plating layer formed on a surface of the nickel plating layer.

* * * * *